United States Patent
Arora et al.

(10) Patent No.: US 10,387,599 B1
(45) Date of Patent: Aug. 20, 2019

(54) SYSTEMS, METHODS, AND COMPUTER-READABLE MEDIA UTILIZING IMPROVED DATA STRUCTURES AND DESIGN FLOW FOR PROGRAMMABLE MEMORY BUILT-IN SELF-TEST (PMBIST)

(71) Applicant: Cadence Design Systems, Inc., San Jose, CA (US)

(72) Inventors: Puneet Arora, Noida (IN); Steven Lee Gregor, Oswego, NY (US); Norman Robert Card, Vestal, NY (US)

(73) Assignee: Cadence Design Systems, Inc., San Jose, CA (US)

( * ) Notice: Subject to any disclaimer, the term of this patent is extended or adjusted under 35 U.S.C. 154(b) by 36 days.

(21) Appl. No.: 15/587,032

(22) Filed: May 4, 2017

(51) Int. Cl.
```
G06F 17/50     (2006.01)
G11C 29/12     (2006.01)
G01R 31/3187   (2006.01)
G06F 11/27     (2006.01)
```

(52) U.S. Cl.
CPC ..... *G06F 17/5045* (2013.01); *G01R 31/3187* (2013.01); *G06F 11/27* (2013.01); *G06F 17/5072* (2013.01); *G11C 29/12* (2013.01)

(58) Field of Classification Search
CPC ...... G01R 31/318508; G01R 31/31724; B64D 2045/0055; Y02T 50/44; G06F 11/267; G06F 11/2733; G06F 17/211; G06F 17/2241; G06F 17/5009; G06F 17/5054; G06F 17/5068
USPC .................................................. 716/100–108
See application file for complete search history.

(56) References Cited

U.S. PATENT DOCUMENTS

| | | | |
|---|---|---|---|
| 7,024,636 B2 * | 4/2006 | Weed | G06F 17/50 700/121 |
| 8,677,306 B1 * | 3/2014 | Andreev | G06F 11/267 714/30 |
| 8,732,651 B1 | 5/2014 | Kukal et al. | |
| 8,990,749 B2 | 3/2015 | Arora et al. | |

(Continued)

OTHER PUBLICATIONS

Richard Goering, Programmable Memory BIST—A New Direction for Design for Test (DFT), Sep. 5, 2013, https://community.cadence.com/cadence_blogs_8/b/ii/archive/2013/09/05/programmable-memory-bist-a-new-direction-for-design-for-test-dft, accessed on May 4, 2017.

*Primary Examiner* — Binh C Tat
(74) *Attorney, Agent, or Firm* — Tarolli, Sundheim, Covell & Tummino LLP (57) ABSTRACT

Computer system for programmable built-in self-test (PMBIST) insertion into system-on-chip designs comprising one or more memories, including at least one processor and computer-executable instructions that cause the system to determine a PMBIST configuration based on one or more test configuration files; generate one or more package files based on the PMBIST configuration; insert PMBIST hardware into the SoC design based on the package files and characteristics of the memories; suspend PMBIST hardware insertion after an event related to the package files; and resume PMBIST hardware insertion after receiving one or more updated package files. In some embodiments, the package files are independent of vendor-specific memory models. In some embodiments, the package files comprise a plurality of data structures. Exemplary methods and computer-readable media can also be provided embodying one or more procedures the system is configured to perform.

22 Claims, 5 Drawing Sheets

(56) References Cited

U.S. PATENT DOCUMENTS

| | | |
|---|---|---|
| 9,304,981 B1 | 4/2016 | Patidar et al. |
| 9,519,732 B1 | 12/2016 | Gennari et al. |
| 2006/0218512 A1* | 9/2006 | Arslan ................ G06F 17/5045 716/102 |
| 2014/0103959 A1* | 4/2014 | Andreev .......... H03K 19/01858 326/41 |
| 2014/0223389 A1* | 8/2014 | Liao ................ G01B 31/31855 716/52 |

* cited by examiner

```
{
target { meminst1 meminst2} {
  interface_control {
    inputs { pipeline_stages { 4 { meminst1 } // how many pipeline stages needed from MBIST logic to memory during MBIST
                               4 { meminst2 }
                             }
           }
    // how many pipeline stages needed from memory to MBIST logic, how many comparators needed
    outputs { comparators { memory_local dedicated} pipeline_stages 3 }
    logic_test none  // do we want to insert shadow logic to bypass memory during ATPG
  }
  failure_recording {
    diagnostics { none }  // do we want diagnostic capabilities
    redundancy_analysis { none }  // do we want redundancy analysis
    self_repair { none }  // do we want self_repair
  }
  sharing_limit 1  // how many memories per MBIST engine (also called SIU)
  testplans { testplan1 testplan 2}  // how to test memories
  clock REF_CLKA clock_mux  // which clock to use during memory testing
}
}
```
310

```
testplan
{
  name testplan_1
  algorithms { march_lr }
  address_orders { fc }
  address_updates { li ca }
  data_backgrounds { cssp cb cs }
  data_orientation word
  programmed
}
```
320

```
testplan
{
  name testplan_2
  algorithms {march_ss march_u }
  address_orders { fc }
  address_updates { li ca }
  data_backgrounds { cssp cb cs }
  data_orientation word
  hardwired
}
```
330

```
-- htpn test conditions
-- ao_max+1 +au_max+1 +db_max+1 +aoh+1 +auh+1 +do
--              macro_support=1: - - - - - - - -
--                      cell_test_support=1: -
-- length set by software based on union of SIU requirements per AMU
-- data are set in true order in constants, left-justified
constant htpntc : htc_array := (
    0=>(
       0=>"000100000010000001000000"
       )
);

constant htpntch : amuli_array := (
    0=>22
);

-- htpn test data (am)
-- data are set in function-based order in constants, left-justified
constant htpnam : htd_array := (
    0=>(
0=>"00100110001100000011010010110000100111111000001001000100000010000111000
01001111110000000010001001001000011"
       )
);
```

Figure 5

SYSTEMS, METHODS, AND COMPUTER-READABLE MEDIA UTILIZING IMPROVED DATA STRUCTURES AND DESIGN FLOW FOR PROGRAMMABLE MEMORY BUILT-IN SELF-TEST (PMBIST)

FIELD OF THE DISCLOSURE

The present disclosure relates generally to the design of integrated circuits for testability. More specifically, the present disclosure relates to systems, methods, and computer-readable media that facilitate development of programmable memory built-in-self-test (PMBIST) by improved data structures and design flows.

BACKGROUND INFORMATION

A system-on-chip (SoC) is an integrated circuit that integrates various components of a computer or other electronic system fabricated on a single die (e.g., silicon die). An SoC can include digital, analog, mixed-signal, and even radio-frequency functions on a single die. SoC digital circuits can include both standard and custom logic circuits (e.g., processors), as well as memory circuits. SoCs can also include digital circuits dedicated to testing and/or verifying the functionality of other portions of the SoC, commonly known as built-in self-test (BIST).

The density and/or feature size of the memories being fabricated is rapidly increasing particularly as compared to SoC logic circuits. Additionally, the portion of an SoC comprising embedded memories is increasing, and can occupy a significant portion of a design. The smaller feature size and increasing portion of an SoC occupied by memories also can result in an increase in potential faults or defects and, consequently, a reduction in SoC yield due to the embedded memories. In the context of these larger SoC designs with more memory, the conventional approach of Direct Memory Access (DMA) for memory testing can be costly in terms of silicon area, routing complexity, and test time. Accordingly, memory built-in self-test (MBIST) has become an attractive alternative and can offer benefits such as high fault coverage with reasonable trade-offs in terms of area, complexity, and test time.

Conventionally, MBIST comprises a variety of pre-established algorithms that can be executed by one or more controllers added to the SoC design for that purpose. Conventionally, MBIST controllers have been designed to execute pre-established algorithms in a pre-specified sequence during SoC manufacturing test. In addition, based on the type of memories and the tests that need to be applied to them, an SoC design can comprise multiple MBIST controllers, each assigned to test one or more of the memories comprising the SoC. For example, in an SoC with 200 memories, 25 controllers can be assigned to test these memories, with each controller responsible for managing the tests of 4-10 memories. Due to optimizations for cost, size, etc., such controllers conventionally have been non-programmable such that their algorithms and targeted fault models cannot be changed after the chip has been manufactured.

Nevertheless, it is possible for new or improved algorithms to be developed for further improvements in, e.g., coverage, speed, reliability, etc. after a chip has been manufactured. To enable testing an already-manufactured chip using such new or improved algorithms, field programmable MBIST (PMBIST) can be utilized. In this approach, the MBIST algorithms can be loaded into a programmable memory and executed by the PMBIST controller, similar to the manner in which modified or updated versions of executable software can be loaded into a computer-readable memory for execution by a processor. A PMBIST controller can provide the capability to apply certain classes and/or variations of algorithms and to change the algorithms that can be applied. For example, a PMBIST controller can allow modification of a test algorithm at run-time simply modifying the test program.

This approach can provide various advantages. For example, during the ramp-up period of a manufacturing process, a designer can determine the defects that are escaping the applied tests, modify existing algorithms or introduce new algorithms to target those defects, and change the test program at run time to catch them. In addition, it can be difficult to predict all types of defects that can manifest themselves during a manufacturing process, so a designer can modify the test algorithms as these become more familiar. Furthermore, an SoC and its revisions can have a design life long enough to be manufactured with different fabrication technologies (e.g., different feature sizes). A certain test suite that was effective and/or efficient for a particular technology when the SoC was originally designed may be unsatisfactory when the SoC design is migrated to a newer technology. Under such circumstances, additional algorithms may need to be applied to detect defects related to the newer technology. In this manner, a PMBIST controller can be re-used across different design revisions or even different designs.

Several issues and/or problems can arise during the development and/or configuration of PMBIST hardware for an SoC design. In the development process for an SoC that includes both hardware (e.g., logic and memory circuits) and software, the hardware is usually created first so that the software can be written based on a known hardware interface. As such, it can be preferable or necessary to develop and/or configure the PMBIST hardware early in the design process. However, a single SoC design can utilize various types of memories that are provided by different memory vendors, each of which can utilize a different memory model. This variety of memory types and models makes early development and/or configuration of comprehensive PMBIST difficult. In addition, the design flow in the electronic design automation (EDA) tool used for PMBIST insertion into the SoC design can be interrupted due to errors in the memory models or the tool itself, causing delay in the PMBIST hardware and, consequently, the software that is dependent on the hardware design.

Accordingly, it can be beneficial to address at least some of these issues and/or problems with improved data structures and design flows for PMBIST development, configuration, and insertion into SoC designs.

SUMMARY

Accordingly, to address at least some of such issues and/or problems, certain exemplary embodiments of computer systems, methods, and computer-readable media for EDA disclosed herein can utilize package files to facilitate more robust analysis of the design requirements and enable reuse of PMBIST hardware and/or clustering of memories where feasible, optimal, necessary, and/or desirable. Furthermore, such exemplary embodiments can provide an improved method, procedure, and/or design flow for PMBIST hardware insertion into an SoC design based on a "suspend/resume" feature. If errors are detected, rather than waiting for a new revision of the EDA tools that corrects the detected errors, the improved method, procedure, and/or design flow suspends the PMBIST hardware insertion until corrected package file(s) are received, then resumes the design flow based on the corrected file(s). As such, exemplary embodiments of computer systems, methods, and computer-readable media disclosed herein can vastly outperform conventional methods, techniques, and systems in various known applications, including exemplary applications discussed herein.

In certain exemplary embodiments of the present disclosure, it is possible to provide a computer system for electronic design automation (EDA) of an SoC design comprising one or more memories, the computer system comprising: a computer arrangement comprising at least one processor; and a programmable memory built-in-self-test (PMBIST) insertion module comprising computer-executable instructions stored on a non-transitory, computer-readable medium, wherein execution of the instructions by the computer arrangement cause the system to: determine a PMBIST configuration based on one or more test configuration files; generate one or more package files based on the PMBIST configuration; insert PMBIST hardware into the SoC design based on the one or more package files and characteristics of the one or more memories; suspend PMBIST hardware insertion after an event related to the one or more package file(s); and resume PMBIST hardware insertion after receiving one or more updated package files. In some exemplary embodiments, the event comprises detecting an error in the one or more package files. In some exemplary embodiments, the one or more updated package files comprise corrections to the error in the one or more package files. In some exemplary embodiments, the one or more updated package files correspond to a modified PMBIST configuration.

In some exemplary embodiments, the one or more package files include information describing one or more of an algorithm unit (AU), a sequence iterator unit (SIU), and a data compare unit (DCU). In some exemplary embodiments, the one or more package files comprise a plurality of data structures. In some exemplary embodiments, at least a portion of the one or more package files are independent of vendor-specific memory models. Other exemplary embodiments include computerized methods and non-transitory, computer-readable media embodying one or more of the procedures that the computer system is configurable to perform.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments, in which.

While the present disclosure will now be described in detail with reference to the figures, it is done so in connection with the illustrative embodiments and is not limited by the particular embodiments illustrated in the figure(s) or in the appended claims.

DETAILED DESCRIPTION

Figure 1:
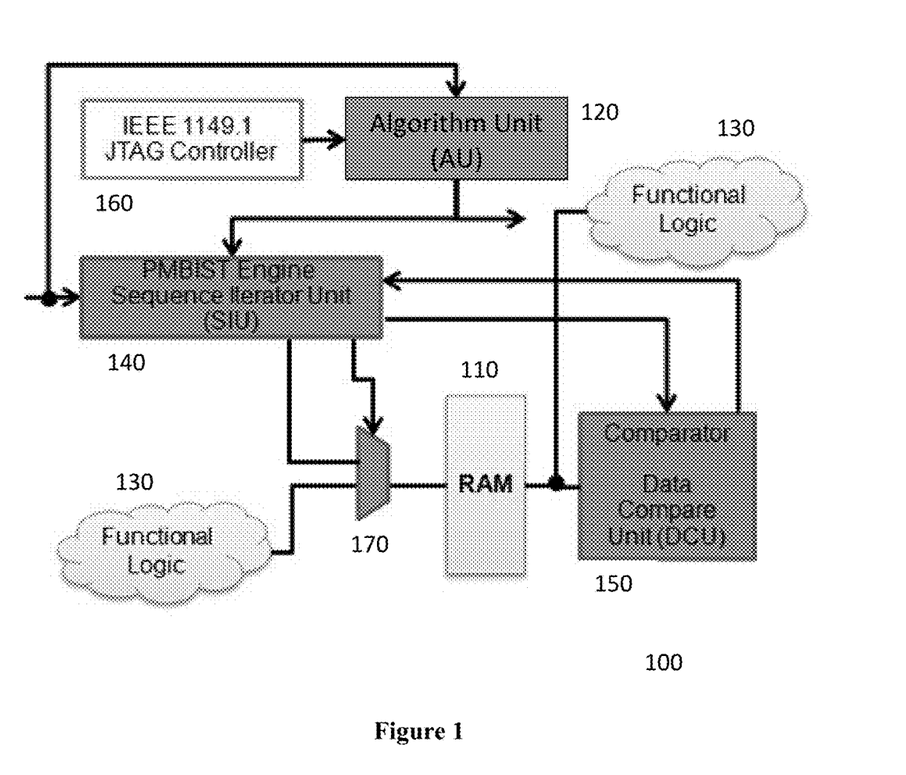
FIG. 1 is a block diagram of an exemplary PMBIST architecture according to one or more exemplary embodiments of the present disclosure.

FIG. 1 is a block diagram of an exemplary PMBIST system 100 that can be utilized, for example, in an SoC design. System 100 can comprise a random access memory (RAM) 110, which is an exemplary SoC memory device to which a designer wishes to apply PMBIST principles and/or techniques described herein. As discussed above, an exemplary SoC design can comprise a plurality of memory devices such as RAM 110. System 100 can also comprise a variety of functional logic blocks 130 that can constitute the digital logic functionality of the SoC. Although two blocks 130 are shown, this is only to illustrate both input and output relationships with RAM 110, as the skilled person will readily comprehend.

System 100 can further comprise an algorithm unit (AU) 120, which embodies various PMBIST algorithms for execution by the PMBIST engine, which is illustrated as sequence iterator unit (SIU) 140. In some exemplary embodiments, AU 120 can comprise any type of readable and rewritable memory (e.g., RAM), with size and power consumption configured according to the requirements of the particular PMBIST application. The various PMBIST algorithms can be loaded into AU 120 via JTAG controller 160. JTAG controller 160 can implement IEEE 1149.1 standards for EDA on-chip instrumentation via a dedicated debug port using a serial communications interface for low-overhead access without requiring direct external access to the SoC address and data buses. For example, the interface can connect to an on-chip test access port (TAP) that implements a stateful protocol to access a set of test registers that present chip logic levels and device capabilities of various parts including, e.g., AU 120. In other exemplary embodiments, AU 120 can comprise a combination of RAM and read-only memory (ROM), which can contain a variety of predefined (e.g., "hard-wired") algorithms that can be built into the PMBIST application. Because ROM can require less area than the same amount of RAM (e.g., kilobytes), such embodiments can be utilized, for example, to reduce the size required to add PMBIST functionality to an SoC design.

In other exemplary embodiments, AU 120 can comprise sequential and combinational logic that implement the PMBIST algorithms executed by SIU 140. Moreover, logic-only (e.g., memory-less) embodiments of AU 120 can provide advantages including, e.g., testability using normal automatic test pattern generation (ATPG, or "scan testing") thereby avoiding further memory testing requirements. Nevertheless, skilled persons will recognize that AU 120 is not limited to memory-only or logic-only embodiments and can be implemented with various combinations of memory and logic as needed, preferred, and/or desired.

SIU 140 can execute the hardwired and/or programmable PMBIST applications resident in AU 120. SIU can comprise any embedded processor or controller that is suitable for the PMBIST application requirements including size, cost, speed, power consumption, etc. Moreover, an SoC design can comprise a plurality of SIUs 140, each of which can be utilized to perform PMBIST on one or more embedded memories, such as RAM 110. When executing a PMBIST application and/or algorithm, SIU 140 can apply various input bit patterns to RAM 110 by controlling multiplexer (mux) 170. In addition, SIU 140 can apply various input bit patterns to data compare unit (DCU) 150, including but not limited to the same input bit patterns applied to RAM 110. Furthermore, SIU 140 can cause RAM 110 to output bit patterns corresponding to the input bit patterns applied to DCU 150 and, in some embodiments, to RAM 110. DCU 150 can compare the bit patterns received from SIU 140 and RAM 110. SIU 140 can then read the result of the comparison from DCU 150, thereby verifying particular functionality and/or identifying faults in RAM 110. In some embodiments, an SoC design can comprise a plurality of DCUs 150, each of which can be configured to perform comparisons of results from one or more memories such as RAM 110.

Different PMBIST algorithms can be utilized to identify different faults that are commonly known (e.g., reasonably likely) to occur in RAM 110. For example, "March" tests comprise a finite sequence of March elements, each of which is a finite sequence of operations applied to every cell in the memory by traversing all memory addresses in any order. The order of accessing memory cells can be the same for all March elements or can be reversed for some March elements. Particular March tests include March C+(also called March 2), March C, March C− (also called March 1), March 3, Column March, Unique data, and Row stripe/column stripe. Checkerboard algorithms are variations of March algorithms in which address-dependent data is written. March algorithms can target faults including stuck-at faults (SAF), transition faults (TF), coupling faults (CF), inversion coupling faults (CFin), idempotent coupling faults (CFid), stuck-open faults (SOF), and certain address decoder faults (AD). An objective of March algorithms can be that every memory cell should be able to be in states 0 and 1, and in order to detect the TFs and CFs, all cells should undergo a rising and a falling transition. The skilled person will readily comprehend that March-type algorithms are merely exemplary, and embodiments of the present disclosure specifically contemplate utilizing any PMBIST algorithms currently known or developed in the future, e.g., for a particular memory application, fabrication process, etc.

As mentioned above, a single SoC design can utilize various types of memories that are provided by different memory vendors, each of which can utilize a different memory model. This variety of memory types and models makes early development of comprehensive PMBIST difficult or cause delays. Such difficulties and/or delays can impact the development of software, which depends upon the existence of a stable hardware interface. Embodiments of the present disclosure can provide a specific technological improvement to PMBIST development and/or configuration by utilizing "package files," a non-vendor-specific, common intermediate form for PMBIST hardware. The package files and their constituent data structures are a technological solution that makes SoC PMBIST hardware development and/or configuration independent of the vendor-specific memory models and facilitates early availability of stable hardware for software development. For example, this technological solution can constitute a specific improvement to electronic design automation (EDA) software tools used for PMBIST development, configuration, and/or insertion into an SoC.

In some exemplary embodiments, EDA tools can comprise PMBIST insertion software that performs design analysis to assess the memory set and features per memory within the design, including testability. Typically, this can involve tradeoffs among various factors including, but not limited to, memory device address size, data width, and column multiplexer factor; number of memory device ports; total test time; test frequency; test algorithm factor; memory devices shared per PMBIST controller; SoC area and power budget for PMBIST functionality. Exemplary embodiments of procedures, computer-readable media, and/or computer systems for EDA can utilize package files to facilitate more robust analysis of the design requirements and enable reuse of PMBIST hardware and/or clustering of memories where feasible, optimal, necessary, and/or desirable. Furthermore, even if multiple instances of PMBIST hardware (e.g., multiple SIU and/or DCU) are necessary and/or desirable within an SoC design, such embodiments can facilitate reusing a particular PMBIST block in multiple instantiations within an SoC design, thereby reducing required time to synthesize the PMBIST hardware. Such advantages are further examples of specific technological improvements to PMBIST development for SoC designs.

Further exemplary embodiments of the present disclosure include electronic design automation (EDA) tools that provide an improved method, procedure, and/or design flow based on a "suspend/resume" feature for PMBIST hardware insertion into an SoC design. During package file generation and/or PMBIST hardware insertion, errors in package file configuration and/or contents can be detected. Such errors can be due to errors (e.g., "bugs") in the EDA tools. Rather than waiting for a new revision of the EDA tools that corrects the detected errors, the improved method, procedure, and/or design flow suspends the PMBIST hardware insertion until corrected package file(s) are received, then resumes the design flow based on the corrected file(s). Since particular package file(s) typically can be corrected much more quickly than the EDA tools used to generate such file(s), the "suspend/resume" feature reduces SoC design time, thereby providing a specific technological improvement to PMBIST development for SoC designs.

Figure 2:
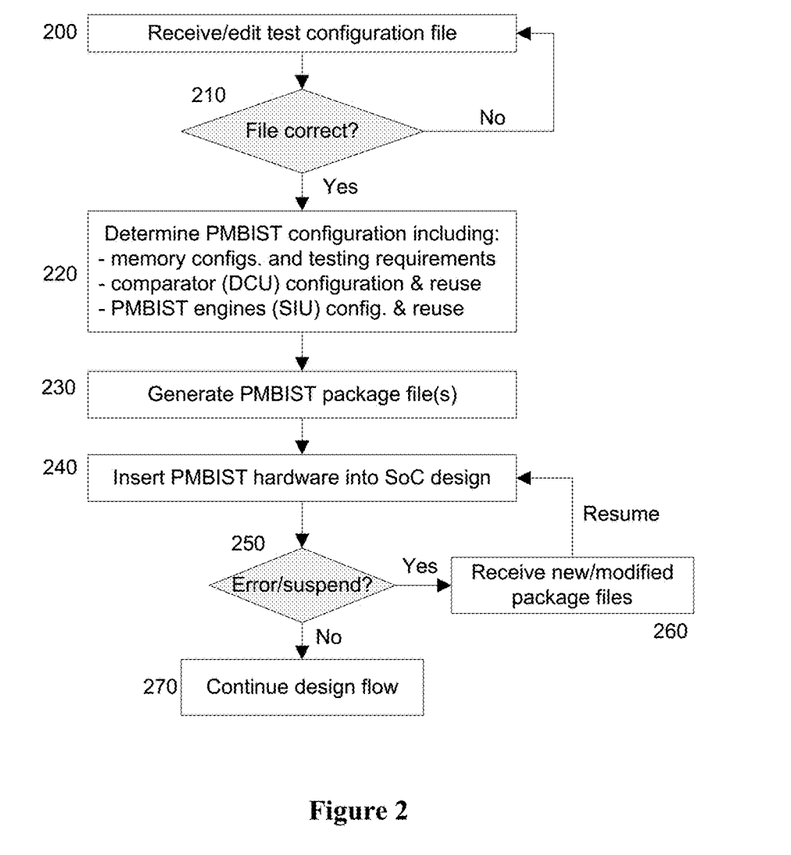
FIG. 2 is a flow diagram of an exemplary method, procedure, and/or design flow for PMBIST hardware configuration and/or insertion into an SoC, according to one or more exemplary embodiments of the present disclosure.

FIG. 2 is a flow diagram of an exemplary method, procedure, and/or design flow for PMBIST hardware development, according to one or more exemplary embodiments of the present disclosure. Although the method, procedure, and/or design flow is illustrated by blocks in the particular order of FIG. 2, this order is merely exemplary and the steps of the method, procedure, and/or design flow can be performed in a different order than shown by FIG. 2, and can be combined and/or divided into blocks having different functionality. In addition, although exemplary embodiments are illustrated as a method, procedure, and/or design flow in FIG. 2, other exemplary embodiments can comprise executable instructions stored on a non-transitory, computer-readable medium or a computer system configured to perform EDA.

Figure 3:
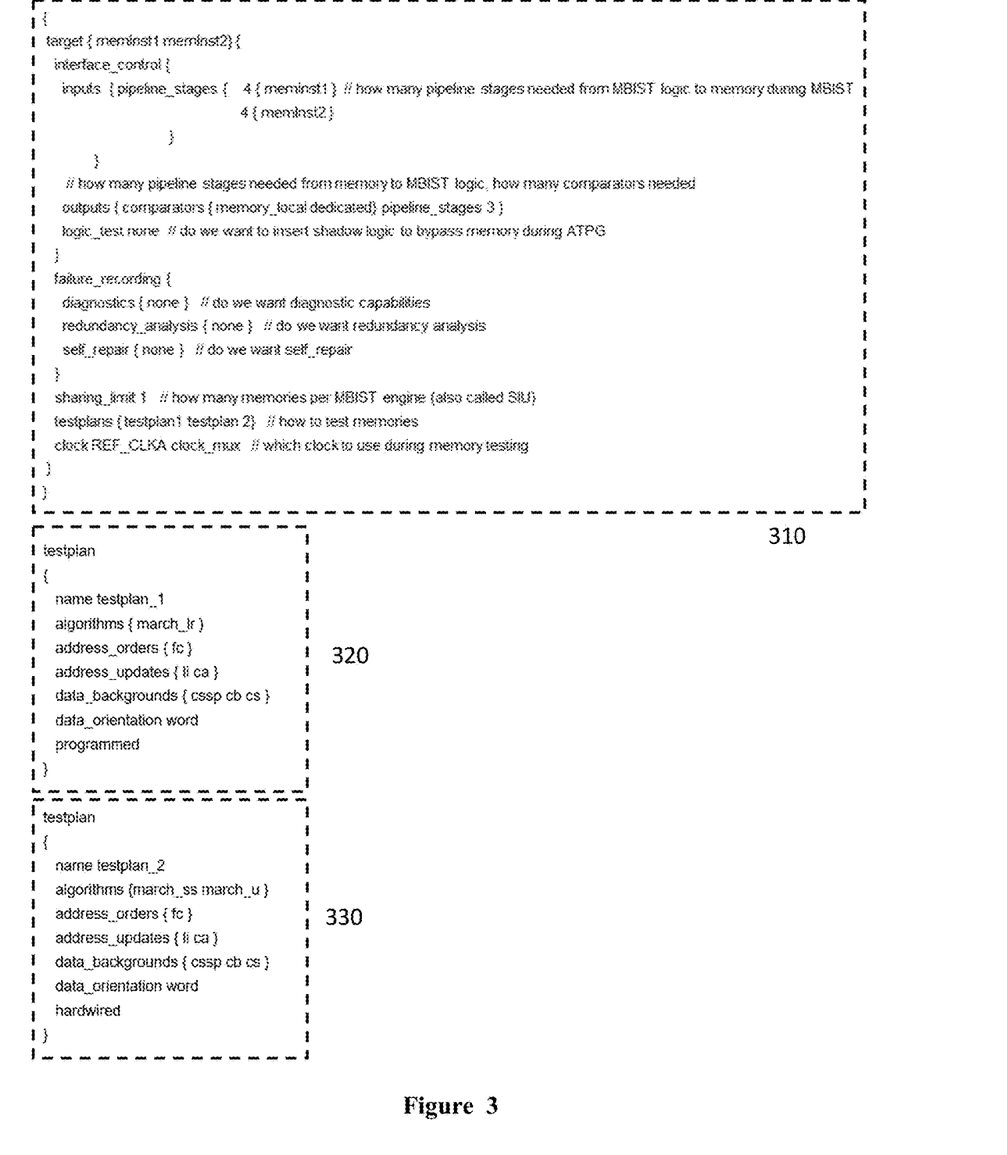
FIG. 3 is an exemplary input configuration file for PMBIST hardware configuration and/or insertion into an SoC, according to one or more exemplary embodiments of the present disclosure.

In block 200, a memory test configuration file is received. FIG. 3 is an exemplary memory test configuration file used for PMBIST hardware development, according to one or more exemplary embodiments of the present disclosure. The configuration file can comprise a target section 310, shown at the top of FIG. 3. Target section 310 can define the number of memories included for PMBIST, of which two are illustrated ("meminst1" and "meminst2"). Target section 310 can also define the number of pipeline stages between PMBIST logic and each of the memories (e.g., four). Target section 310 can also define requirements on diagnostics, redundancy analysis, etc. Target section 310 can also define the number of memories tested by each PMBIST engine or SIU (e.g., one).

In addition, the configuration file can also identify one or more testplans to be used for testing the specified memories, and can include a section further defining each identified testplan. In the illustrated embodiment, the configuration file identifies two testplans—"testplan1" and "testplan2"—and includes respective sections 320 and 330 further defining these testplans. For example, section 320 defines "testplan1" as a programmed test sequence utilizing a "March_lr" algorithm along with particular address and data configurations. Likewise, section 330 defines "testplan2" as a hard-wired test sequence utilizing two different March algorithms along with the same address and data configurations as "testplan1."

Returning to FIG. 2, in block 210, the correctness of the test configuration file is verified. This verification can include parsing the file to determine if there are any syntax errors, e.g., missing brackets/braces, misspelled commands, undefined variables, etc. Verification can also include determining if required elements are missing, e.g., if section 330 defining "testplan2" were missing. In the event such errors are detected, the user can be notified (e.g., visibly and/or audibly) and given an opportunity to correct such errors by returning to block 200 where the file can be edited.

Once the file is verified to be correct in block 210, the operation proceeds to block 220 where the file can be analyzed to determine various parameters necessary or desirable for configuration of PMBIST hardware. For example, the file can be analyzed to determine the testing requirements for all memories. In the exemplary file shown in FIG. 3, such testing requirements can be specified by the testplan information shown in sections 320 and 330. The file can also be analyzed to determine the configuration of comparators (DCUs), including sharing and/or reuse in the design. For example, the operation of block 220 can determine if the same set of memories requesting same set of features are associated with more than one comparator, allowing the comparator to be synthesized once and copied rather than synthesizing different comparator modules. Similarly, the operation of block 220 can determine the configuration of one or more PMBIST engines (SIUs) to be used in the design. This can include determining the number and capabilities (including memory) of each SIU, as well as the mapping of memories to particular SIUs. This operation also can include determining the SIU synthesis requirements in a manner similar to the determination of comparator synthesis discussed above. The operation of block 220 can include other optimizations as needed and/or desired.

Figure 5:
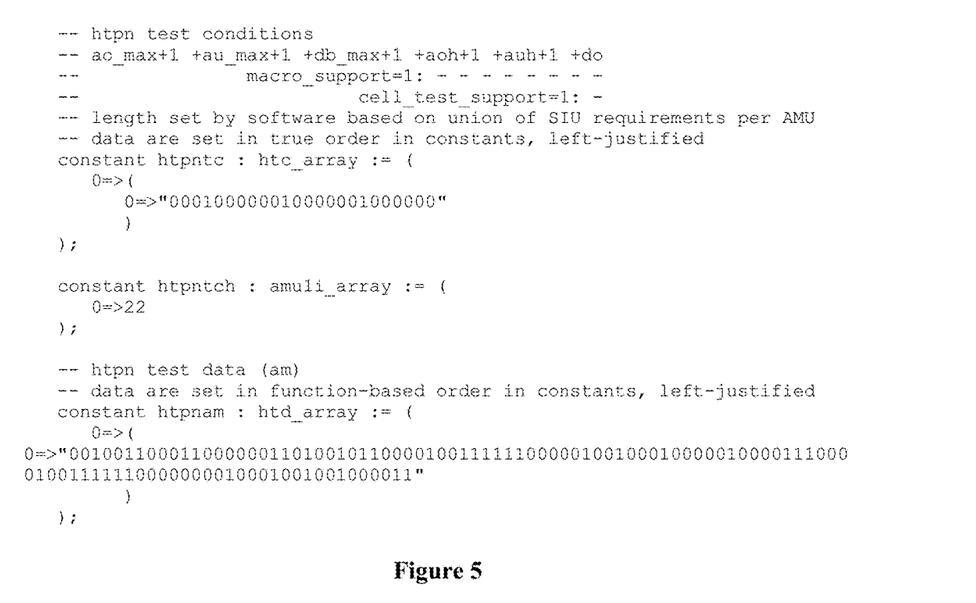
FIG. 5 is an exemplary portion of an exemplary package file for PMBIST hardware configuration and/or insertion into an SoC, according to one or more exemplary embodiments of the present disclosure.

After the analysis of block 220 has been completed, one or more PMBIST package files can be generated in block 230. In some exemplary embodiments, the one or more package files generated in block 230 can be independent of vendor-specific memory models. For example, package file(s) can be generated to configure the generic PMBIST hardware in multiple ways to test different configurations of the user requirements. Furthermore, package file(s) can combine the features and user test configurations for the targeted memories into a representation for use in hardware synthesis. In some exemplary embodiments, the package file(s) can be written in VHDL (VHSIC Hardware Description Language) or any other language, format, and/or syntax suitable for EDA. In some exemplary embodiments, a package file can be generated for each of the PMBIST components, e.g., AU 120, SIU 140, DCU 150, etc. as shown in FIG. 1. Package files can include various constants, data structures, etc. An exemplary package file entry describing certain functionality of AU 120 in VHDL format is shown in FIG. 5.

After creation of the package file(s), the operation of block 240 inserts the PMBIST hardware specified by the package file(s) into the SoC design. This operation can include, for example, synthesizing the actual PMBIST hardware according to user requirements and/or models of particular memories included the SoC. This operation can include, for example, configuring the PMBIST hardware according to the configurations of the memory device address and data buses. Persons skilled in SoC design and/or EDA will readily comprehend other configurations that can occur during the operation of block 240. In some exemplary embodiments, the operations of blocks 230 and 240 can be fully or partially combined such that, e.g., the package file(s) can be fully or partially generated during insertion of the PMBIST hardware in the SoC design.

The operation of block 250 determines if an error has resulted from the PMBIST insertion operation of block 240. This error determination and/or detection can occur during and/or subsequent to the insertion operation of block 250. For example, the operation of block 250 can detect an error in one of the package file(s), e.g., a particular variable or constant is given an incorrect value causing the PMBIST hardware to be configured incorrectly and/or not inserted into the design. This can occur, for example, due to an error in the EDA tool(s) used for package file generation and/or PMBIST hardware insertion. If detected during insertion, the operation of block 240 can be suspended automatically and the user can be notified of the error in various ways, including visibly (e.g., displayed message) and/or audibly.

In some embodiments, the user can be provided the option to suspend the operation of block 240, either in conjunction with or independent of the error notification. In such embodiments, the user can suspend the operation by operation of a user interface device. In exemplary embodiments where suspend can be independent of an error, the user can suspend the operation of block 240, for example, if the user wishes to add or modify features of the PMBIST hardware configuration. This can be necessary and/or desirable in response to changes to the SoC design and/or other changes (e.g., process node and/or transistor structure) that result in untested conditions. If there is no error/suspend condition in block 250, then the procedure continues to block 270 which represents the remainder of the design flow for the particular SoC.

If an error/suspend condition occurs in block 250, the operation proceeds to block 260 where the insertion of PMBIST hardware (block 240) is halted until receipt of new and/or modified package files. Modified package file(s) can be provided via user editing of the file(s) generated in block 240 or via another party (e.g., the EDA tool vendor). New package files can be generated, e.g., using the operations of blocks 200-230 based on changes to PMBIST configuration needed for SoC design and/or fabrication. After receiving such new and/or modified file(s), the procedure returns to block 250 where PMBIST hardware insertion is resumed based upon such new and/or modified file(s). For example, the PMBIST hardware insertion can be resumed at the point where it was suspended. Furthermore, the resume operation can be performed automatically or upon input from the user, e.g., via a user interface device. The operations of blocks 240-260 can be repeated as needed and/or desired until all errors have been identified and corrected.

As discussed above, the ability to receive and resume the design using corrected package file(s) can drastically reduce the delay required in conventional methods, in which a user would have to wait to receive corrections to the EDA tool(s) used to generate the file(s) and/or insert the PMBIST hardware. For example, the feature can reduce the delay from one month to several days or even several hours.

Figure 4:
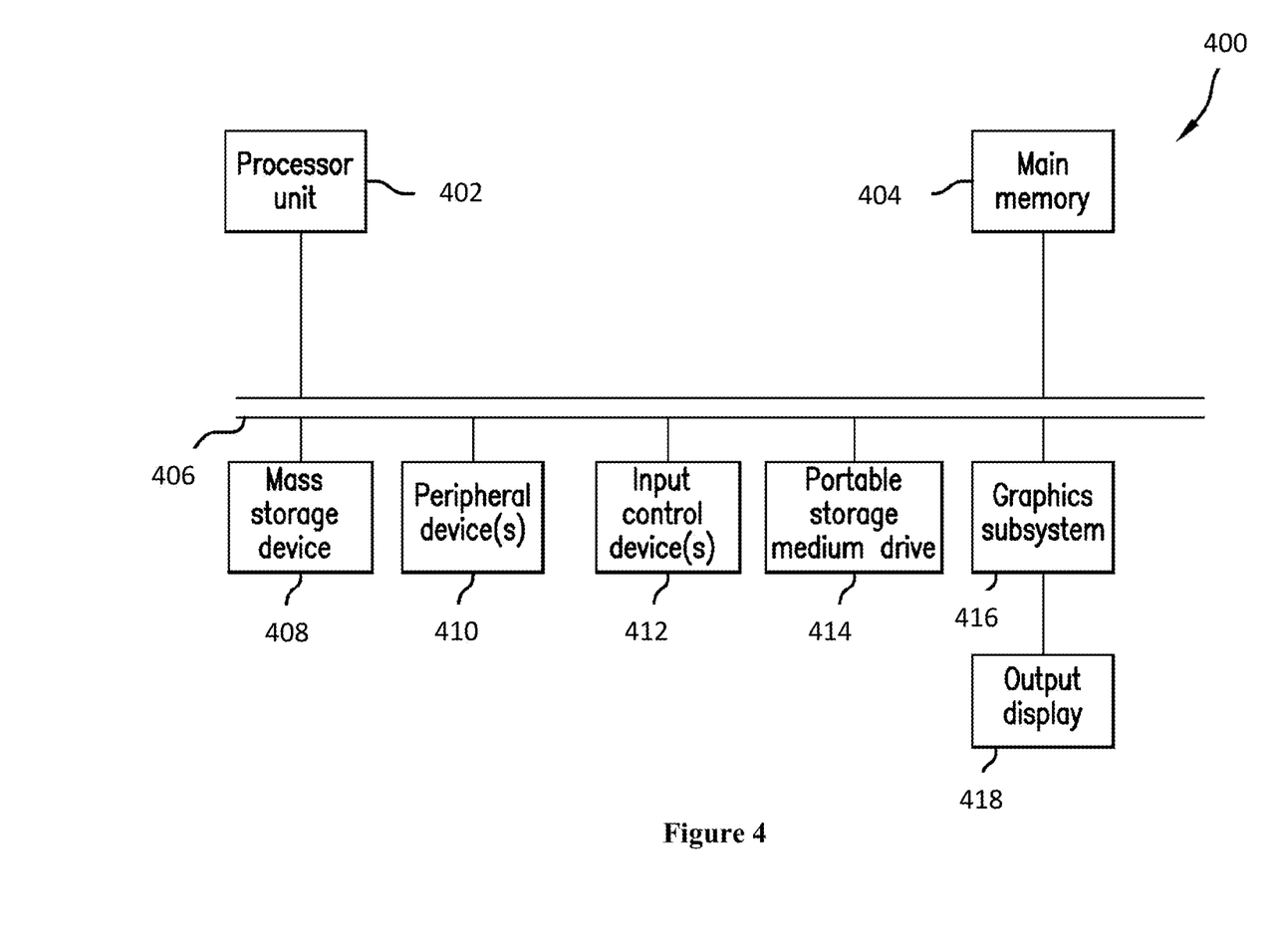
FIG. 4 is a block diagram of an exemplary computer system for performing electronic design automation (EDA), according to one or more exemplary embodiments of the present disclosure.

Although various embodiments are described herein above in terms of methods, the person of ordinary skill will readily comprehend that such methods can be embodied by various combinations of hardware and software in various systems, computing devices, apparatuses, non-transitory computer-readable media, etc. FIG. 4 is a block diagram of an exemplary computer system in accordance with various embodiments of the present disclosure. More specifically, FIG. 4 shows an exemplary computer system for EDA utilizing exemplary embodiments of the present disclosure described above with reference to FIGS. 1-3 and 5. Although various embodiments of computer system 400 can include generic and/or off-the-shelf components, computer system 400 as a whole can be configured specifically for the application-specific, computationally-demanding tasks of EDA for SoC design, including synthesis, simulation, and PMBIST design and insertion as described hereinabove.

Computer system 400 contains a processor unit 402, a main memory 404, an interconnect bus 406, a mass storage device 408, peripheral device(s) 410, input control device(s) 412, portable storage drive(s) 414, a graphics subsystem 416, and an output display 418. Processor unit 402 can include a single microprocessor or a plurality of microprocessors for configuring computer system 400 as a multi-processor system. Processor 402 can also comprise one or more graphics processors, which can be utilized for various graphics and computationally-intensive tasks that can constitute EDA applications. In addition or in the alternative, processor 402 can comprise one or more custom-designed processors and/or supporting hardware to facilitate efficient execution of EDA applications. Main memory 404 stores, in part, instructions and data to be executed by processor 402. Main memory 404 preferably includes banks of dynamic random access memory (e.g., DDR3/DDR4/DDR5 DRAM) as well as high-speed cache memory. Main memory 404 can further comprise graphics DRAM (e.g., GDDR5 DRAM). Furthermore, if processor 402 comprises multiple constituent processors (e.g., one or more microprocessors and one or more graphics processors), main memory 404 can be configured to be shared among all constituent processors or, in other exemplary embodiments, such that portions of main memory 404 can be accessed by some constituent processors and not by others.

For the purpose of simplicity, the components of computer system 400 are illustrated as connected via interconnect bus 406. However, computer system 400 can be connected through one or more data transport measures. For example, processor unit 402 and main memory 404 can be connected via a local microprocessor bus while mass storage device 408, peripheral device(s) 410, portable storage medium drive(s) 414, and graphic subsystem 416 can be connected via one or more input/output (I/O) buses. Mass storage device 408, which can be implemented with a magnetic disk drive, an optical disk drive, a solid state device, or an attachment to network storage, is non-volatile storage device for storing data, databases, and instructions, to be used by processor unit 402. In a software embodiment, mass storage device 408 can store the software to load it into main memory 404 for execution by processor 402. Such software can include, for example, EDA applications comprising a plurality of computer-executable instructions.

Portable storage medium 414 operates in conjunction with a portable non-volatile storage medium such as a floppy disk, a compact disk read only memory (CD-ROM), or a digital versatile disk read only memory (DVD-ROM), to input and output data and code to and from the computer system 400. In one embodiment, the software is stored on such a portable medium, and is input to computer system 400 via portable storage medium 414. In some exemplary embodiments, EDA applications can reside as encoded information on portable storage medium 414 before being loaded into mass storage device 408 and/or main memory 404.

Peripheral device(s) 410 can include any type of computer support device such as an input/output (I/O) interface, to add additional functionality to computer system 400. For example, peripheral device(s) 410 can include a network interface card to interface computer system 400 to a network. Peripheral device(s) 410 can also include a schematic scanner unit to digitize a schematic drawing, a plotter device for printing large-scale design drawings, a 3D printer operable to construct a physical prototype of a device, a silicon mask printer, a foundry for fabricating devices in silicon (which can be located off-site or spatially removed—though ultimately receiving a design from an EDA tool), lithography proto-typing equipment, testing interfaces for interfacing with an actual device, and the like.

Input control device(s) 412 provide a portion of the user interface for a computer system 400. Input control device(s) 412 can include an alphanumeric keypad for inputting alphanumeric and other key information; and a cursor control device such as a mouse, a track pad or stylus; or cursor direction keys. In order to display textual and graphical information, computer system 400 can include graphic subsystem 414 and output display(s) 418. Output display 418 can include a cathode ray tube (CRT) display, liquid crystal display (LCD), plasma, projector, or active matrix organic light emitting diode (AMOLED) display. Graphic subsystem 416 can receive textual and graphical information and processes the information for output to display 418. In some exemplary embodiments, graphics subsystem 416 can share functionality with main processor 402.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. A computer system for electronic design automation (EDA) of a system-on-chip (SoC) design comprising one or more memories, the computer system comprising:
    a computer arrangement comprising at least one processor; and
    a programmable memory built-in-self-test (PMBIST) insertion module comprising computer-executable instructions stored on a non-transitory, computer-readable medium, wherein execution of the instructions by the computer arrangement cause the system to:
    determine a PMBIST configuration based on one or more test configuration files;
    generate one or more package files based on the PMBIST configuration;
    insert PMBIST hardware into the SoC design based on the one or more package files and characteristics of the one or more memories;
    suspend PMBIST hardware insertion after an event related to the one or more package file(s); and
    resume PMBIST hardware insertion at the point where the insertion was suspended after receiving one or more updated package files to provide the SoC design with the PMBIST hardware inserted.

2. The computer system of claim 1, wherein the event comprises detecting an error in the one or more package files.

3. The computer system of claim 2, wherein the one or more updated package files comprise corrections to the error in the one or more package files.

4. The computer system of claim 1, wherein:
    the event comprises a user input; and
    the PMBIST insertion module further comprises instructions that, when executed, cause the system to receive the user input and to suspend the PMBIST hardware insertion in response to the received user input.

5. The computer system of claim 4, wherein the one or more updated package files correspond to a modified PMBIST configuration.

6. The computer system of claim 1, wherein the test configuration file includes one or more memory testplans.

7. The computer system of claim 6, wherein the test configuration file includes a programmable testplan and a hardwired testplan.

8. The computer system of claim 1, wherein the one or more package files include information describing one or more of an algorithm unit (AU), a sequence iterator unit (SIU), and a data compare unit (DCU).

9. The computer system of claim 1, wherein the one or more package files include information describing reuse of one or more of an algorithm unit (AU), a sequence iterator unit (SIU), and a data compare unit (DCU).

10. The computer system of claim 1, wherein the one or more package files comprise a plurality of data structures.

11. The computer system of claim 1, wherein at least a portion of the one or more package files are independent of vendor-specific memory models.

12. A computer-implemented method for electronic design automation (EDA) of a system-on-chip (SoC) design comprising one or more memories, comprising:
    determining a programmable memory built-in-self-test (PMBIST) configuration based on one or more test configuration files;
    generating one or more package files based on the PMBIST configuration;
    inserting PMBIST hardware into the SoC design based on the one or more package files and characteristics of the one or more memories;
    suspending PMBIST hardware insertion after an event related to the one or more package file(s); and
    resuming PMBIST hardware insertion at the point where the insertion was suspended after receiving one or more updated package files to provide the SoC design with the PMBIST hardware inserted.

13. The computer-implemented method of claim 12, wherein:
    the event comprises detecting an error in the one or more package files; and
    the one or more updated package files comprise corrections to the error in the one or more package files.

14. The computer-implemented method of claim 12, wherein the event comprises a user input and the one or more updated package files correspond to a modified PMBIST configuration; and further comprising receiving the user input and to suspend the PMBIST hardware insertion in response to the received user input.

15. The computer-implemented method of claim 12, wherein at least a portion of the one or more package files are independent of vendor-specific memory models.

16. A non-transitory, computer-readable medium comprising computer-executable instructions for electronic design automation (EDA) of a system-on-chip (SoC) design comprising one or more memories, wherein execution of the instructions causes a computer arrangement to:
    determine a programmable memory built-in-self-test (PMBIST) configuration based on one or more test configuration files;
    generate one or more package files based on the PMBIST configuration;
    insert PMBIST hardware into the SoC design based on the one or more package files and characteristics of the one or more memories;
    suspend PMBIST hardware insertion after an event related to the one or more package file(s); and
    resume PMBIST hardware insertion at the point where the insertion was suspended after receiving one or more updated package files to provide the SoC design with the PMBIST hardware inserted.

17. The non-transitory, computer-readable medium of claim 16, wherein:
    the event comprises detecting an error in the one or more package files; and the one or more updated package files comprise corrections to the error in the one or more package files.

18. The non-transitory, computer-readable medium of claim 16, wherein the event comprises a user input and the one or more updated package files correspond to a modified PMBIST configuration; and further comprising instructions that, when executed, cause the computer arrangement to receive the user input and to suspend the PMBIST hardware insertion in response to the received user input.

19. The non-transitory, computer-readable medium of claim 16, wherein the one or more package files include data structures describing one or more of an algorithm unit (AU), a sequence iterator unit (SIU), and a data compare unit (DCU).

20. The non-transitory, computer-readable medium of claim 16, wherein at least a portion of the one or more package files are independent of vendor-specific memory models.

21. The computer system of claim 1, wherein at least one of the generated package files comprises a very high speed integrated circuit hardware design language (VHDL) file that characterizes functionality of an algorithm unit (AU), wherein the AU comprises a readable and rewriteable memory that has size and power consumption configured according to parameters for a particular PMBIST application.

22. The computer system of claim 21, wherein the AU stores at least one PMBIST algorithm, and wherein at least one of the generated package files comprises a sequence iterator unit (SIU) configured to execute the at least one PMBIST algorithm.

* * * * *